(12) United States Patent
Shi et al.

(10) Patent No.: US 12,474,762 B2
(45) Date of Patent: Nov. 18, 2025

(54) CONTAINER-BASED APPLICATION MANAGEMENT METHOD AND APPARATUS

(71) Applicant: Alibaba Group Holding Limited, Grand Cayman (KY)

(72) Inventors: Mingwei Shi, Hangzhou (CN); Xinyu Zhou, Hangzhou (CN); Xiaobin Xu, Hangzhou (CN); Shichao Nie, Hangzhou (CN); Zhouxiang Zhan, Hangzhou (CN); Chuan Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 97 days.

(21) Appl. No.: 18/141,230

(22) Filed: Apr. 28, 2023

(65) Prior Publication Data
US 2023/0266814 A1    Aug. 24, 2023

Related U.S. Application Data

(63) Continuation of application No. PCT/CN2021/125158, filed on Oct. 21, 2021.

(30) Foreign Application Priority Data

Oct. 30, 2020   (CN) .......................... 202011194163.X

(51) Int. Cl.
*G06F 1/3293*    (2019.01)
*G06F 9/50*    (2006.01)

(52) U.S. Cl.
CPC ............ *G06F 1/3293* (2013.01); *G06F 9/505* (2013.01)

(58) Field of Classification Search
CPC .............................. G06F 1/3293; G06F 9/505
See application file for complete search history.

(56) References Cited

U.S. PATENT DOCUMENTS

| 11,301,285 | B1 * | 4/2022 | Korobov ................. G06F 9/505 |
| 2010/0161909 | A1 * | 6/2010 | Nation .................. G06F 9/5016 |
| | | | 711/147 |

(Continued)

FOREIGN PATENT DOCUMENTS

| CN | 105245617 A | 1/2016 |
| CN | 108076082 A | 5/2018 |

(Continued)

OTHER PUBLICATIONS

English Translation of CN First Office Action dated Jul. 20, 2023 for corresponding CN Application No. 202011194163.X, 11 pages.

(Continued)

*Primary Examiner* — Aurel Prifti
(74) *Attorney, Agent, or Firm* — Lee & Hayes, P.C.

(57) ABSTRACT

A container-based application management method and apparatus are disclosed. A container-based serverless computing system is configured such that an application instance is allowed to be in one of an online state and a low-power state at runtime. In response to scaling down an application, at least one first application instance of the application in the online state is caused to enter the low-power state; and in response to scaling up the application, at least one second application instance of the application in the low-power state is caused to enter the online state. In this way, not only the cost of the application instance can be reduced, but also rapid elastic scaling can be performed on the application instance.

21 Claims, 11 Drawing Sheets

(56) References Cited

U.S. PATENT DOCUMENTS

| | | | |
|---|---|---|---|
| 2011/0213997 A1* | 9/2011 | Kansal | G06F 1/3206 713/340 |
| 2012/0290865 A1* | 11/2012 | Kansal | G06F 1/329 713/340 |
| 2013/0247034 A1* | 9/2013 | Messerli | G06F 9/45533 718/1 |
| 2015/0143149 A1* | 5/2015 | Oney | G06F 9/45558 713/321 |
| 2017/0199770 A1 | 7/2017 | Peteva et al. | |
| 2018/0032380 A1* | 2/2018 | Jackson | G06F 9/5072 |
| 2019/0020711 A1* | 1/2019 | Alfieri | H04L 41/5051 |
| 2019/0052457 A1* | 2/2019 | Connor | G06F 16/2237 |
| 2019/0317812 A1* | 10/2019 | Gebara | G06Q 40/04 |
| 2020/0034168 A1* | 1/2020 | Singleton, IV | G06F 9/5044 |
| 2020/0142825 A1* | 5/2020 | Barczak | G06F 3/061 |
| 2020/0210237 A1* | 7/2020 | Saraf | G06F 9/5005 |
| 2021/0011741 A1* | 1/2021 | Bartfai-Walcott | H04L 9/3268 |
| 2021/0042140 A1* | 2/2021 | Paul | G06F 1/3206 |
| 2021/0365379 A1* | 11/2021 | Creed | G06F 9/505 |
| 2022/0197760 A1* | 6/2022 | Singleton, IV | G06F 9/45558 |
| 2022/0229684 A1* | 7/2022 | Waldspurger | G06F 9/5077 |
| 2022/0229774 A1* | 7/2022 | Waldspurger | G06F 12/0873 |
| 2022/0391262 A1* | 12/2022 | Knaup | G06F 9/5088 |
| 2024/0028098 A1* | 1/2024 | Kolesnikov | G06F 1/3287 |
| 2024/0303124 A1* | 9/2024 | White | G06F 9/505 |
| 2024/0303127 A1* | 9/2024 | White | G06F 9/5077 |
| 2024/0305535 A1* | 9/2024 | White | H04L 41/5025 |
| 2025/0045088 A1* | 2/2025 | Keshari | G06F 9/45558 |

FOREIGN PATENT DOCUMENTS

| | | |
|---|---|---|
| CN | 110990119 A | 4/2020 |
| CN | 111611086 A | 9/2020 |
| CN | 111786904 A | 10/2020 |
| CN | 113296880 A | 8/2021 |
| EP | 3396543 A1 | 10/2018 |

OTHER PUBLICATIONS

English Translation of PCT International Search Report dated Jan. 18, 2022 for corresponding PCT Application No. 202011194163.X, 2 pages.

English Translation of PCT Written Opinion dated Jan. 18, 2022 for corresponding PCT Application No. 202011194163.X, 5 pages.

Cadden, et al., "SEUSS: Rapid serverless deployment using environment snapshots", retrieved on Sep. 16, 2024 at <<https://arxiv.org/pdf/1910.01558>>, Cornell University, Oct. 3, 2019, pp. 1-8.

Search Report for European Application No. 21885008.9, Dated Sep. 16, 2024, 14 pages.

* cited by examiner

Impose limit on resource quota for at least one first application instance
S502

Downgrade resource configuration of respective container where at least one first application instance is located
S504

FIG. 5

CONTAINER-BASED APPLICATION MANAGEMENT METHOD AND APPARATUS

CROSS REFERENCE TO RELATED APPLICATIONS

This application claims priority to and is a continuation of PCT Patent Application No. PCT/CN2021/125158, filed on 21 Oct. 2021 and entitled "CONTAINER-BASED APPLICATION MANAGEMENT METHOD AND APPARATUS," which claims priority to Chinese Patent Application No. 202011194163.X, filed on 30 Oct. 2020 and entitled "CONTAINER-BASED APPLICATION MANAGEMENT METHOD AND APPARATUS," which are incorporated herein by reference in their entirety.

TECHNICAL FIELD

The present disclosure relates to the field of serverless computing, and, more particularly, to container-based application management solutions.

BACKGROUND

In a cloud computing scenario, serverless computing is a mode that enables application developers to focus on their core products without having to care about the running state of the application locally or at a server in a cloud.

In an automatic scaling scenario in the field of serverless computing, the elastic time of an application, namely the time required for the application to achieve elastic scaling, is a very important indicator.

Especially in a cloud computing scenario, application instances need to be elastically scaled according to the real-time traffic of the application. If the elastic time of an application is too long, the scheduling platform will not be able to scale up and down the application instances flexibly and quickly. Or it takes a long time to monitor the traffic for scaling to ensure that the scale-down operation has no impact on services, resulting in a waste of computing resources.

For the scale-up operation, it is necessary to achieve a quick start of instances. Currently, in some systems or environments, there are two main solutions as follows to achieve a quick start of instances.

One solution is to create a new process by forking or cloning based on an application architecture, thereby accelerating the cold start of the application. Taking the Android mobile operating system as an example, the zygote framework is commonly used for the start of an application in the system, and other running instances are all created by forking from the main zygote process. The same services that the application depends on are loaded as much as possible before forking, so as to achieve a quick start of the application.

The scale-up of an application architecture based on the zygote model largely depends on the application architecture. For stock applications, the application architecture needs to be greatly adjusted. Therefore, this solution is not suitable for stock applications.

Moreover, generally speaking, the cold start of an application takes a long time, and it cannot meet the requirements for rapid scale-up.

The other solution is to use the checkpoint/restore snapshot technology. A snapshot is created after an application starts. When the application needs to be scaled up, the created snapshot is used to speed up the start process of the application.

There are also two typical snapshot solutions.

One is snapshot replication, in which only one snapshot is created for one application. This snapshot is used to create all application instances.

For the snapshot replication solution, if there is some persistent state information in an application when a snapshot is created, such as UUID information, the generated multiple instances will have problems in accuracy and security.

The other is one-to-one snapshot, in which one application instance corresponds to one snapshot, and one snapshot is used to restore one application instance.

This snapshot solution needs to start an application instance in advance, and then create a snapshot and store it for the started application instance. When the application instance needs to be restored, the corresponding snapshot is restored. Therefore, the snapshot management and storage cost of this solution is relatively high.

Moreover, the snapshot creation process may be bound to specific machine characteristics, resulting in that subsequent snapshot restoration still needs to be performed on the machine with the bound machine characteristics, and cannot be performed in other environments. Therefore, the snapshot is not universal.

In addition, the one-to-one snapshot solution also has a problem in the time state. For example, for some applications that depend on the actual time, snapshot creation will depend on the time of creation; and when the snapshot is restored, the time when the snapshot was created will also be restored simultaneously. In this way, the application logic may be affected by timing, thus causing execution logic errors.

In other words, in the conventional techniques, in the field of serverless computing, the elastic scaling capacity of an application is not yet able to meet the growing demand for application elasticity.

Therefore, there is still a need for a solution that quickly and elastically scales up and down application instances as the traffic of the application changes, for example.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

A technical problem to be solved in the present disclosure is to provide a container-based application management method and apparatus, which can not only reduce the cost of application instances, but also perform rapid elastic scaling on the application instances.

According to an example embodiment of the present disclosure, a container-based application management method is provided, comprising: configuring a container-based serverless computing system such that an application instance is allowed to be in one of an online state and a low-power state at runtime, wherein the application instance consumes less power and/or resources in the low-power state than it does in the online state; in response to scaling down an application, causing at least one first application instance of the application in the online state to enter the low-power state; and in response to scaling up the application, causing at least one second application instance of the application in the low-power state to enter the online state.

For example, the causing the at least one first application instance of the application in the online state to enter the low-power state comprises: imposing a limit on a resource quota for the at least one first application instance; and downgrading a resource configuration of a respective container where the at least one first application instance is located, and/or the causing the at least one second application instance of the application in the low-power state to enter the online state comprises: upgrading a resource configuration of a respective container where the at least one second application instance is located; and releasing a limit on a resource quota for the at least one second application instance.

For example, the causing the at least one second application instance of the application in the low-power state to enter the online state comprises: causing, in priority, a second application instance in a container on a machine with relatively idle resources in a node where the container is located to enter the online state.

For example, the method may further comprise: when the application instance is to enter the online state but resources in a node where it is located are insufficient, migrating the application instance to a relatively idle node based on a live migration function of a checkpoint/restore in userspace (CRIU) techno; and/or when multiple application instances in the low-power state are located on the same node, making one or more of the application instances into a checkpoint snapshot based on the CRIU technology, and then based on the checkpoint snapshot, restoring the one or more of the application instances on the relatively idle node.

For example, the limit on the resource quota for the application instance is imposed or released based on a control groups (Cgroups) mechanism; and/or when the resource configuration of the container is downgraded, based on an in-place pod resource update mechanism, resources released by the container where the application instance is located are returned to a scheduling system; and/or when the resource configuration of the container is upgraded, based on the in-place pod resource update mechanism, resources are requested for the container from the scheduling system.

For example, the causing the at least one first application instance to enter the low-power state comprises: based on a CPU sharing function, adding a plurality of the first application instances to run in a CPU group with a low-power specification, wherein application instances in the CPU group with the low-power specification share the CPU; and/or the causing the at least one second application instance to enter the online state comprises: causing the second application instance to exit the CPU group with the low-power specification.

For example, the causing the at least one first application instance to enter the low-power state comprises: causing a memory space occupied by the at least one first application instance to be within a memory range for low-power instances in a memory; and/or causing the at least one second application instance to enter the online state comprises: causing a memory space occupied by the at least one second application instance to be outside the memory range for the low-power instances in the memory.

For example, the memory range for the low-power instances is a range outside an execution range of a periodic memory management operation in the memory.

For example, the periodic memory management operation comprises a memory garbage collection operation and/or a memory release operation for releasing a memory that has not been used within a predetermined period.

For example, the method may further comprise: in response to a range adjustment instruction, adjusting the execution range and/or a size thereof; and/or when a first application instance occupying a memory space enters the low-power state, setting the execution range to exclude the memory space occupied by the first application instance; and/or when a first application instance occupying a memory space enters the online state, setting the execution range to include the memory space occupied by the first application instance.

For example, the causing the at least one first application instance to enter the low-power state comprises: closing some resources used by the first application instance or reducing a usage amount of some resources, and only reserving some system resources used by the first application instance.

For example, the method may further comprise causing memory data of one or more application instances in the low-power state to be transferred between a memory and a storage device.

For example, the causing the memory data of the one or more application instances in the low-power state to be transferred between the memory and the storage device comprises: using a memory swap function in kernel mode to cause the memory data of the one or more application instances in the low-power state to be transferred between the memory and the storage device; and/or using a memory swap function in user mode to cause the memory data of the one or more application instances in the low-power state to be transferred between the memory and the storage device and to cause memory data from different containers to be transferred to different storage devices or different pages of the storage device.

For example, memory data of multiple application instances in the low-power state are simultaneously transferred from the memory to the different storage devices or the different pages of the storage device by using the memory swap function in user mode, and/or memory data of multiple application instances in the low-power state are simultaneously transferred from the different storage devices or the different pages of the storage device to the memory.

For example, the method may further comprise: receiving a memory swap setting instruction for an application or an application instance, wherein the memory swap setting instruction is configured to indicate whether the memory swap function in kernel mode or the memory swap function in user mode is used to perform memory data transfer for an application instance of the application or the application instance; and in response to the memory swap setting instruction, setting the memory swap function used to perform the memory data transfer for the application instance of the application or the application instance.

For example, when the memory swap function in user mode is used, multiple high-performance cloud storages are used to construct storage devices for swap with the same priority.

For example, the causing the memory data of the one or more application instances in the low-power state to be transferred between the memory and the storage device comprises: based on a least recently used (LRU) algorithm, selecting the memory data of the one or more application instances in the low-power state, and transferring and persisting it from the memory into the storage device; and/or in response to a swap-back instruction or a traffic request or an instance deployment strategy change, transferring the memory data of the one or more application instances in the low-power state on the storage device back to the memory.

For example, after memory data of the second application instance has been transferred to the storage device, the causing the at least one second application instance of the application in the low-power state to enter the online state further comprises: transferring the memory data of the second application instance from the storage device to an execution range of a periodic memory management operation in the memory.

For example, in response to a scale-down instruction for the application, or in response to that the application becomes a low-traffic application due to its traffic falling below a first predetermined threshold, the application is scaled down; and/or in response to a scale-up instruction for the application, or in response to that the application's traffic rises above a second predetermined threshold, the application is scaled up.

According to an example embodiment of the present disclosure, a container-based application management apparatus deployed in a container-based serverless computing system is provided, wherein the serverless computing system is configured to allow an application instance to be in one of an online state and a low-power state at runtime, the application instance consumes less power and/or resources in the low-power state than it does in the online state, and the apparatus comprises: a scale-down apparatus, configured to, in response to scaling down an application, cause at least one first application instance of the application in the online state to enter the low-power state; and a scale-up apparatus, configured to, in response to scaling up the application, causing at least one second application instance of the application in the low-power state to enter the online state.

For example, the scale-down apparatus may comprise: a quota limiting apparatus, configured to impose a limit on a resource quota for the at least one first application instance of a low-traffic application; and a configuration downgrading apparatus, configured to downgrade a resource configuration of a respective container where the at least one first application instance is located.

For example, the scale-up apparatus may comprise: a configuration upgrading apparatus, configured to upgrade a resource configuration of a respective container where the at least one second application instance is located; and a quota restoring apparatus, configured to release a limit on a resource quota for the at least one second application instance.

For example, the apparatus may further comprise: a memory swap storage apparatus, configured to cause memory data of one or more first application instances in the at least one first application instance to be transferred between a memory and a storage device.

According to an example embodiment of the present disclosure, a computing device is provided, comprising: a processor; and a storage device having a computer-executable instruction stored thereon, wherein when the computer-executable instruction is executed by the processor, the processor is caused to execute the method according to the above-described method.

According to an example embodiment of the present disclosure, a non-transitory machine-readable storage medium having a computer-executable instruction stored thereon is provided, wherein when the computer-executable instruction is executed by a processor of an electronic device, the processor is caused to execute the method according to the above-described method.

Thus, a container-based application management method and apparatus are achieved, which can perform rapid elastic scaling on application instances.

BRIEF DESCRIPTION OF DRAWINGS

The above and other objectives, features, and advantages of the present disclosure will become more apparent by describing the exemplary embodiments of the present disclosure in more detail with reference to the accompanying drawings, wherein the same reference numbers generally represent the same parts in the exemplary embodiments of the present disclosure.

FIG. 5 is a schematic flowchart of a scale-down stage of an application management method according to an embodiment of the present disclosure;

DESCRIPTION OF EMBODIMENTS

Figure 1:
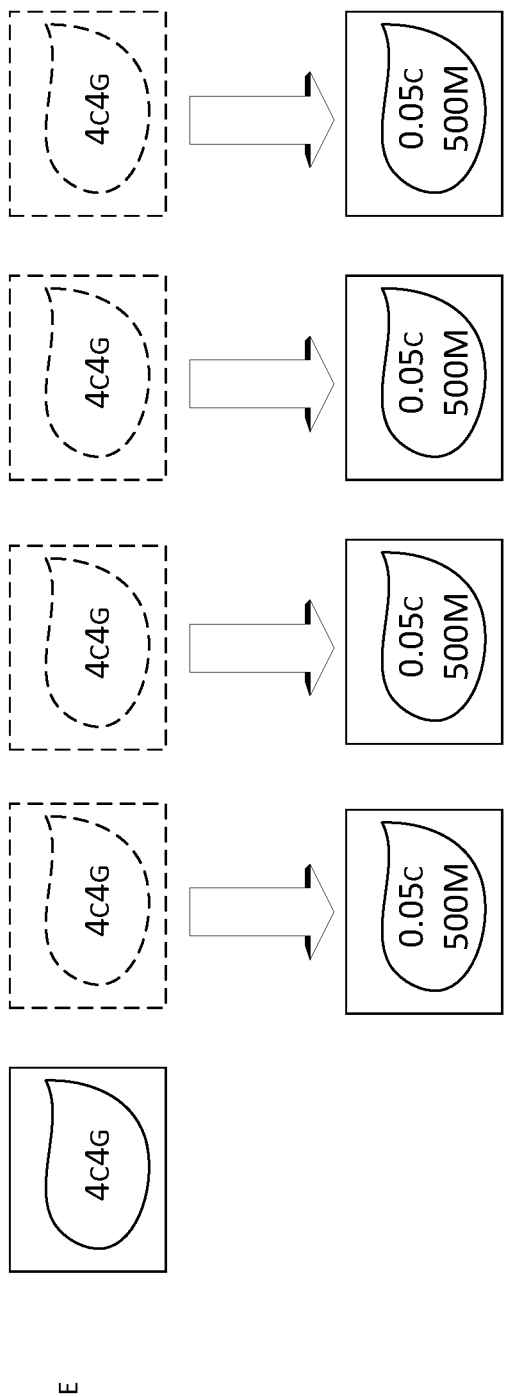
FIG. 1 is a schematic diagram of elastic scale-down of an application according to an embodiment of the present disclosure.

Hereinafter, example embodiments of the present disclosure will be described in more detail with reference to the accompanying drawings. Although the accompanying drawings show example embodiments of the present disclosure, it should be understood that the present disclosure may be implemented in various forms and should not be limited by the embodiments set forth herein. Rather, these embodiments are provided to make the present disclosure more thorough and complete and to fully convey the scope of the present disclosure to those skilled in the art.

In the context of the present disclosure, the terms "first" and "second" are only used for distinguishing and limiting functions rather than for distinguishing sequence, priority, or importance.

For ease of description, in the context of the present disclosure, a "first application instance" is used to indicate an application instance in a scale-down process; and a "second application instance" is used to indicate an application instance in a scale-up process. With the switching of the working state of an application instance, the wording of the first application instance and the second application instance can also be converted to each other. That is, after the first application instance enters the low-power state through scale-down, it can also be used as the second application instance of the present disclosure when it is about to undergo scale-up again, and vice versa.

An application instance in the low-power state may be referred to as a "low-power application instance." An application instance in the online state may be referred to as an "online application instance."

On some occasions, an "application instance" may also be referred to as an "instance" for short.

According to the present disclosure, a container-based application management solution in a serverless computing scenario is provided.

Serverless computing elasticity means that in a serverless computing mode, in order to cope with changes in service request traffic, application running instances need to be increased from one (or a small number of) instances to multiple (or a large number of) instances, or decreased from multiple copies to fewer copies. We call the processes of increasing and decreasing scale-up and scale-down respectively, and the capacity to scale up and down is called elasticity.

From the perspective of whether cross-machine scaling is involved, elasticity can be divided into vertical elasticity and horizontal elasticity. Vertical elasticity refers to a scaling behavior that occurs on the same host, while horizontal elasticity refers to a scaling behavior across hosts.

The elasticity mentioned in the present disclosure refers to the scaling of an application. Scale-up means that an instance of an application changes from a low-power (low-traffic) state (also referred to as a "low-power running state," "low-power mode," or "low-power running mode") to a state where it can receive full traffic (full-traffic/full-power state, which can also be called "online state"), while scale-down means changing from the state of receiving traffic to the state of standby. It should be understood that scale-up may also change an instance from a low-power state to a partial-traffic/partial-power state, that is, a state in which the traffic/power consumption falls between the low-power/low-traffic state and the full-traffic/full-power state. Correspondingly, scale-down may also include changing an instance from the partial-traffic/partial-power state to the low-power/low-traffic state.

In the low-power mode, the activity of an application instance at runtime can be limited, thus reducing the resource consumption of the application instance.

The power and/or resource consumption of an application instance in the low-power state is less than that in the online state.

For example, a proportional value may be set so that the power and/or resource consumption in the low-power state is equal to or less than the set numerical value or corresponding proportional value. The proportional value may be, for example, 10%, 5%, 2%, 1%, and so on.

In addition, different numerical values or different corresponding proportional values may also be set for power consumption or different types of resources.

When an application instance in the online state enters the low-power state, some resources used by the application instance may be closed or the usage amount of some resources may be reduced, and only some system resources used by the application instance are reserved. For example, the thread pool may be closed or the number of threads in the thread pool may be reduced, while system resources such as file descriptors are kept open.

Correspondingly, when an application instance in the low-power state enters the online state, some resources that are closed or the usage amount thereof can be restored.

In addition, the memory footprint of an application instance is greatly reduced in the low-power mode, and a large number of memory spaces originally occupied are released and no longer used. Such memory spaces no longer used, including heap and non-heap memory spaces, can be cleaned up and allocated to other application instances.

Different from directly freezing application instances, in the low-power state (mode), an application instance can still provide certain services, such as configuration push and so on.

Figure 2:
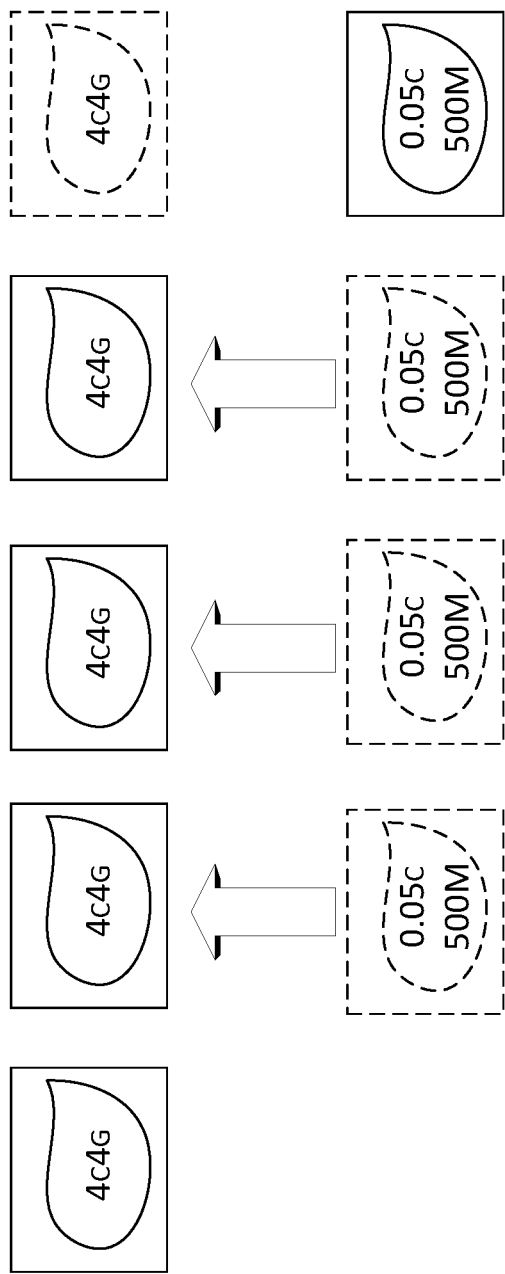
FIG. 2 is a schematic diagram of elastic scale-up of an application according to an embodiment of the present disclosure.

FIGS. 1 and 2 schematically show the state changes of several instances of an application during the processes of scale-down and scale-up. As an example, five instances are shown for an application. It should be understood that the number of instances corresponding to an application is not limited thereto.

In addition, as shown in the figures, the resources occupied by the online instances (full-traffic state) are "4c, 4G," that is, 4 cores (CPUs) and 4G memory, while the resources occupied by the low-power instances (low-power state) are "0.05c, 500M," that is, 0.05 core (CPU) and 500M memory. It should be understood that the number of resources is not limited thereto, and it is not required that each instance occupies the same number of resources. Moreover, the resources occupied by each instance can also be adjusted according to the real-time traffic. In addition, the types of resources are not limited to CPUs and memory, and may also include other types of resources.

In the figures, the solid-line box represents the current state of the instance, the dotted line represents the previous state, and the arrow represents the state change direction.

FIG. 1 is a schematic diagram of elastic scale-down of an application according to an embodiment of the present disclosure.

For example, in response to a scale-down instruction for a low-traffic application, or for example, in response to that an application becomes a low-traffic application due to its traffic falling below a first predetermined threshold, the application may be scaled down so that one or more application instances that were originally in an online state enter a low-power state and are converted into low-power instances.

During scale-down, all or some of the online instances corresponding to the application can be converted into low-power instances according to the instruction or real-time traffic.

In FIG. 1, during scale down, the online instance 102 occupying 4c and 4G is converted to the low-power insurance occupying 0.05c and 500M.

FIG. 2 is a schematic diagram of elastic scale-up of an application according to an embodiment of the present disclosure.

For example, in response to a scale-up instruction for a low-traffic application, or for example, in response to that a low-traffic application's traffic rises above a second predetermined threshold, the application may be scaled up so that one or more application instances that were originally in a low-power state enter an online state and are converted into online instances. Here, the second predetermined threshold may be higher than or equal to the first threshold.

During scale-up, all or some of the low-power instances corresponding to the application can also be converted to online instances according to the instruction or real-time traffic.

In FIG. 2, during scale up, the low-power instance 202 occupying 0.05c and 500< is converted to the online instance 204 occupying 4c and 4G.

The scaling according to the present disclosure will be described in detail below with reference to FIGS. 3 to 10.

Figure 3:
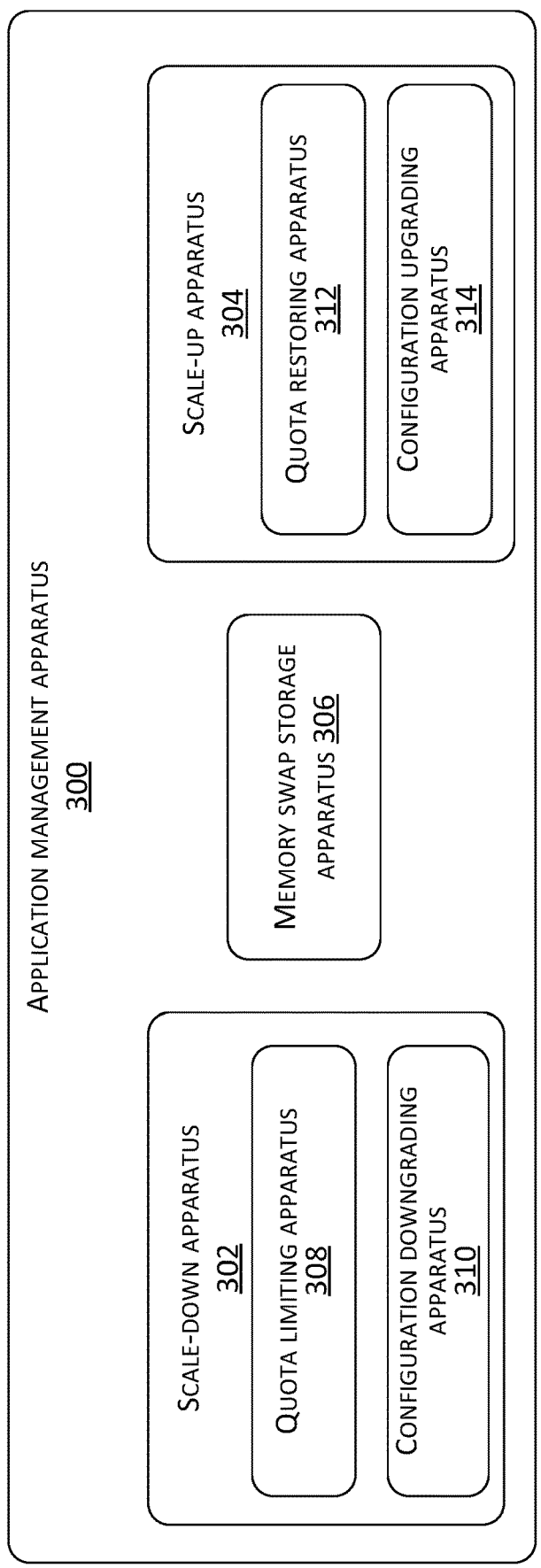
FIG. 3 is a schematic block diagram of an application management apparatus according to an embodiment of the present disclosure.

FIG. 3 is a schematic block diagram of an application management apparatus according to an embodiment of the present disclosure.

As shown in FIG. 3, an application management apparatus 300 according to an embodiment of the present disclosure may include a scale-down apparatus 302, a scale-up apparatus 304, and a memory swap storage apparatus 306.

The scale-down apparatus 302 may include a quota limiting apparatus 308 and a configuration downgrading apparatus 310.

The scale-up apparatus 304 may include a quota restoring apparatus 312 and a configuration upgrading apparatus 314.

Figure 4:
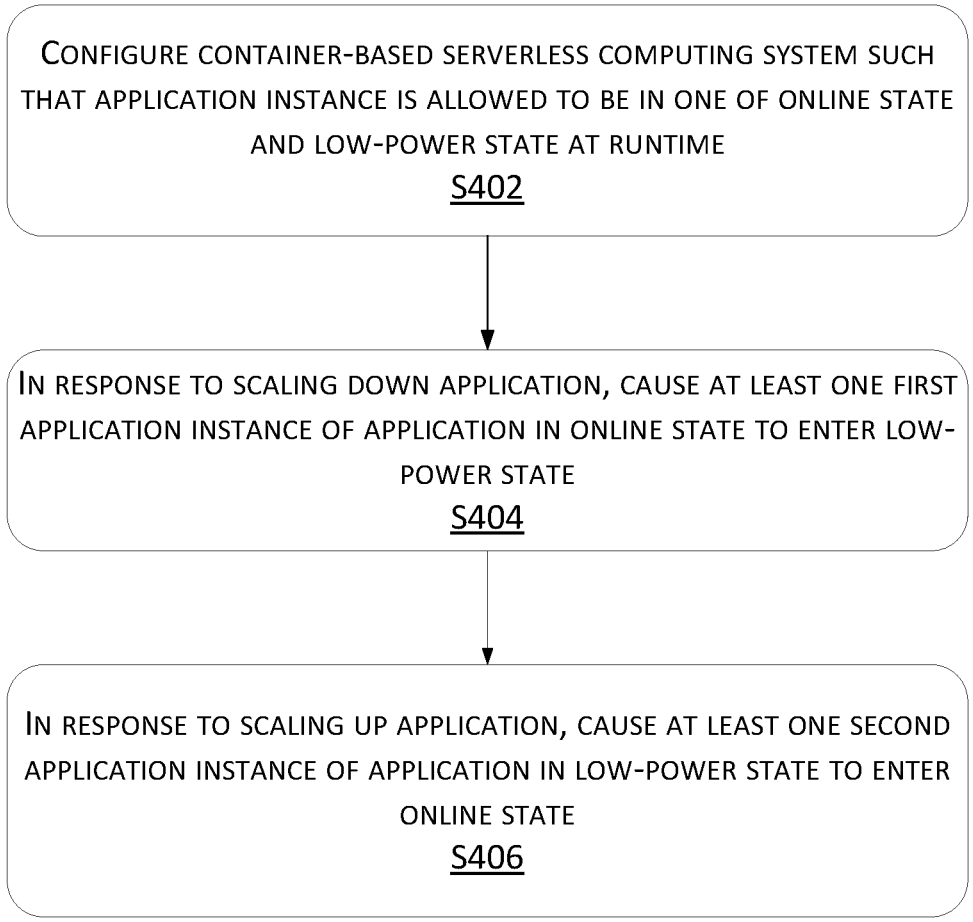
FIG. 4 is a schematic flowchart of an application management method according to an embodiment of the present disclosure.

FIG. 4 is a schematic flowchart of an application management method according to an embodiment of the present disclosure.

As shown in FIG. 4, in Step S402, a container-based serverless computing system is configured such that an application instance is allowed to be in one of an online state and a low-power state at runtime.

By enabling the system to support the application instance to work in the low-power state/mode at runtime, the upper layer of the system at runtime can know whether the application instance is working in the low-power state, which can avoid a large number of page in/page out operations caused by the behavior of the application, so as to avoid causing the system to be unavailable.

During scale-down, in Step S404, for example, in response to scaling down an application, at least one first application instance of the application in the online state is caused to enter the low-power state through the scale-down apparatus 302.

During scale-up, in Step S406, for example, in response to scaling up an application, at least one second application instance of the application in the low-power state is caused to enter the online state through the scale-up apparatus 304.

The scale-down according to the present disclosure will be described first below. As described above, the scale-down here may be performed, for example, in response to a scale-down instruction for a low-traffic application, or for example, in response to that an application becomes a low-traffic application due to its traffic falling below a first predetermined threshold.

The following describes scale-down operations.

FIG. 5 is a schematic flowchart of Step S404 of a scale-down stage of an application management method according to an embodiment of the present disclosure.

As shown in FIG. 5, in Step S502, for example, the resource quota of at least one first application instance of an application in the online state to be scaled down may be limited by the quota limiting apparatus 308. At S502, limit on resource quota for at least one first application instance is imposed.

Here, the limit on the resource quota of the application instance may be imposed or released based on a Cgroups mechanism.

The Cgroups mechanism is a mechanism provided by the Linux kernel that can limit resources used by a single process or a group of processes. Cgroups define a subsystem for each type of controllable resources so that fine-grained control of resources such as CPUs and memory can be achieved. In a cloud computing environment, most of currently popular container technologies rely heavily on the resource limitation capacity provided by Cgroups to complete control of resources such as CPUs and memory.

Correspondingly, at least one first application instance enters the low-power (running) state.

The present disclosure proposes the concept of implementing low-power running on legacy applications. The applications are extremely inactive during periods of no (or low) traffic. In this state, theoretically, the CPU consumption required by the applications is very low, and the memory footprint is very small. This state in which an instance runs can be referred to as a low-power state (low-power running).

Low-power running is a running state of an application instance, in which the application instance is in the survival running state, but only provides limited services. Compared with the full-power (full-traffic) running state, the low-power running state occupies few system resources and can quickly respond to external events of the system. According to the present disclosure, in the case of a specific event (for example, in response to a scale-up instruction, or in response to that a low-traffic application's traffic rises above a second predetermined threshold), the running application instance can be quickly restored from the low-power running state to the full-power running state, so as to have the full service capability and undertake a large number of external traffic requests.

The application instance runs in the low-power state at runtime, and the CPU and memory specifications of the low-power application instance can be downgraded to a very low level through the Cgroups mechanism in the above-described Step S502.

On the one hand, regarding the CPU, based on a CPU share (CPU share) function, multiple first application instances may be added to run in a CPU group with a low-power specification. The application instances in this CPU group share the CPU.

In this way, it is convenient to centralize the resources allocated to the low-power instances to the shared CPU, further reducing the CPU resources used in the low-power running mode, and it is also possible to isolate the CPU occupied by the low-power instances from that used by the full-power instances.

In addition, when a second application instance is caused to enter the online state by subsequent execution of scale-up, the second application instance may also be caused to exit the CPU group with the low-power specification.

On the other hand, regarding the memory, the memory management solution in the low-power instance management according to the present disclosure will be described in detail below.

The application management solution of the present disclosure requires the application to support the low-power running mode at runtime.

The reason why some legacy Java applications do not support low-power running at runtime is because of the characteristics of JVM (Java Virtual Machine) memory management: even if there is no external traffic request, JVM memory will allocate objects within the entire heap memory range and will perform periodic garbage collection (GC) operations, and these behaviors will cause a large number of memory areas in the Java heap to be touched. An update of the survival information of a GC operation object will also cause a large amount of memory to become dirty data.

In order to enable Java to support low-power running at runtime, firstly, the Java application is caused to enter the low-power running state. In the low-power state, the garbage collection (GC) operation of the Java process only acts on a small part of the heap memory range. In other words, only local GC is performed to ensure that the JVM's memory footprint is limited to a range in the low-power mode.

The elastic heap capacity provided by AJDK may be utilized to provide low-power running capabilities for processes. In the low-power mode, GC can only act on a limited heap range, and the elastic heap provides low-power running elastic heap size settings, which can usually be ⅒ of the normal heap range.

In addition, in the Java language system, not only the heap memory but also the native memory can be released.

The above describes periodic GC scanning in the Java language. Other languages also have their own low-power operations, such as a memory release operation that releases memory that has not been used within a predetermined period, which will also affect the running state of application instances in the low-power state. Therefore, these operations that affect the low-power running state of low-power application instances can also be limited within a local memory range, and the memory space occupied by the low-power application instances is set outside the execution range of these operations.

In addition to the periodic garbage collection operation and the memory release operation described here, the execution range of other periodic memory management operations that may invoke low-power instances or affect the low-power running state of low-power instances can also be limited.

In response to a range adjustment instruction, the set size of the execution range of the periodic memory management operation may be adjusted, or the start and end points of the execution range may be adjusted.

Figure 7:
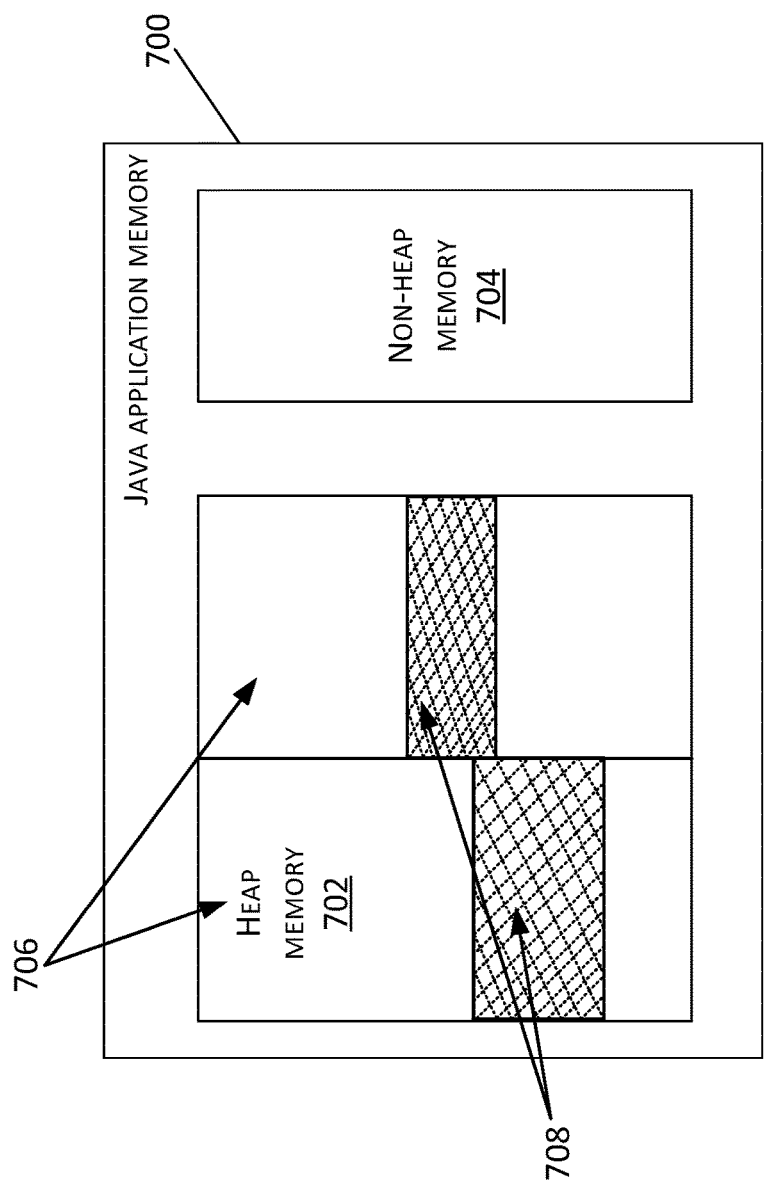
FIG. 7 is a schematic diagram of low-power memory range management according to an embodiment of the present disclosure.

FIG. 7 is a schematic diagram of low-power memory range management according to an embodiment of the present disclosure.

The Java application memory 700 may include heap memory 702 and non-heap memory 704.

In the heap memory 702, the execution range 706 of a periodic memory management operation is defined, and the range 708 outside the execution range 706 is a memory range for low-power instances. In the memory range 708 for low-power instances, the above-mentioned periodic memory management operation is not performed.

When at least one first application instance of the application is caused to enter the low-power state, the memory space occupied by these first application instances may be caused to be within the memory range for low-power instances in the memory.

For example, the memory space occupied by these first application instances may be transferred from the defined execution range of the periodic memory management operation to the memory range for low-power instances outside the execution range.

Alternatively, a range adjustment instruction may also be sent to adjust the execution range: when a first application instance occupying a memory space enters the low-power state, the execution range is set to not include the occupied memory space; or when a first application instance occupying a memory space enters the online state, the execution range is set to include the occupied memory space.

In this way, without having to actually move the memory data, the memory space occupied by the application instance can be switched, corresponding to the change of the running state of the application instance, between the above-mentioned execution range and the above-mentioned memory range for low-power instances.

In addition to switching the memory data of the instance between the above-mentioned execution range of an online instance and the memory range for low-power instances, for example, by using the least recently used (LRU) algorithm of the memory of the operating system, the inactive memory in the low-power mode/state may be further swapped out to the swap area (memory data swap device or storage device).

Figure 8:
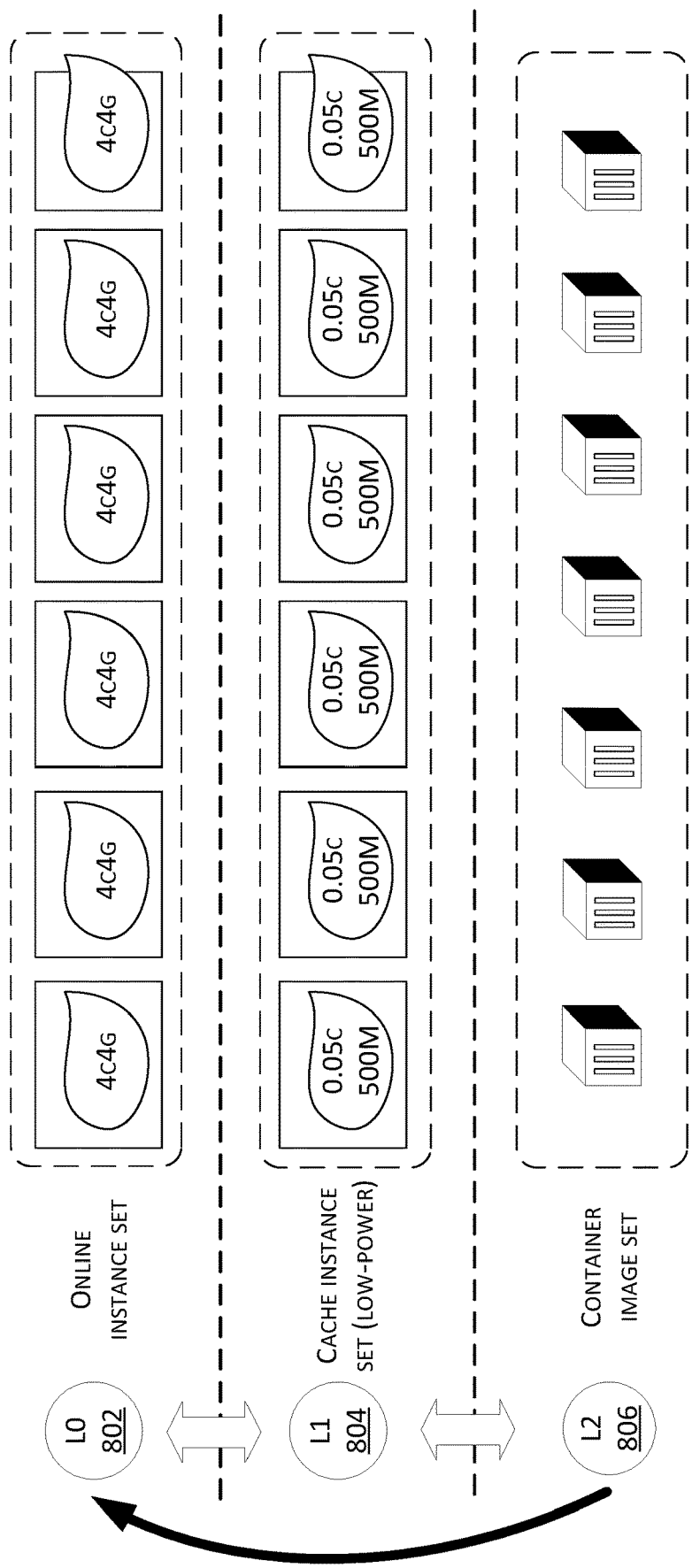
FIG. 8 is a schematic diagram of instance state transition according to an embodiment of the present disclosure.

FIG. 8 is a schematic diagram of instance state transition according to an embodiment of the present disclosure.

As shown in FIG. 8, the storage of memory data can be logically divided into three layers, namely L0 layer 802, L1 layer 804, and L2 layer 806.

The L0 layer 802 includes the memory data of online instances, which is located within the above-mentioned execution range of the periodic memory management operation and outside the above-mentioned memory range for low-power instances.

The L1 layer 804 includes the memory data of low-power (cache) instances, which is located within the above-mentioned memory range for low-power instances and outside the above-mentioned execution range of the periodic memory management operation.

The L2 layer 806 includes the memory data swapped (persisted) to a swap device or storage device, such as an external hard disk or cloud disk. For example, images can be formed respectively for each container, that is, a container image set, to achieve data isolation between containers.

The memory data of application instances can be switched between the L0 layer 802 and the L1 layer 804 as the running state changes. Likewise, the memory data can be swapped between the L1 layer 804 and the L2 layer 806, for example, based on the LRU algorithm described above. Alternatively, as described below, it is also possible to transfer directly from the L2 layer 806 to the L1 layer 804 during scale-up.

Swap is an important part of the memory subsystem in the current Linux operating system. The Linux operating system uses the swap capability to increase the virtual memory available to a node. With the help of the swap capability, the operating system can swap out and persist the data in the main memory to the swap device. In this way, the system can allocate the obtained (released) main memory to other processes (instances) for use. At the same time, in the case of insufficient system memory, swapping can effectively prevent the system from out of memory (OOM) errors. When these memory pages are accessed by the system again, the operating system reads the data of these memory pages from the swap device and loads them into the main memory to ensure the normal operation of the process.

In this way, for example, the memory data of at least one low-power application instance can be transferred between the memory and the storage device through the memory swap storage apparatus 306.

Here, based on the least recently used algorithm, the memory data of one or more low-power application instances located in the memory range for low-power instances in the memory may be selected, and transferred and persisted from the memory to the storage device.

In response to a swap-back instruction or a traffic request or an instance deployment strategy change, the memory data of the one or more low-power application instances on the storage device are transferred back to the memory. A high-speed network disk may be used as a swap device (memory data swap device/storage device) for storing the memory swapped out.

In addition, the default swap capability/strategy of the operating system, that is, the memory swap function in kernel mode, may be used to perform memory data swapping.

However, with the current swap capability of the Linux system, physical hosts share the same swap storage space, and the memory data swapped out by multiple application instances (swapped out from the memory to the storage device) will be stored on the storage device shared by multiple hosts. Therefore, swap does not support C group isolation.

Figure 9:
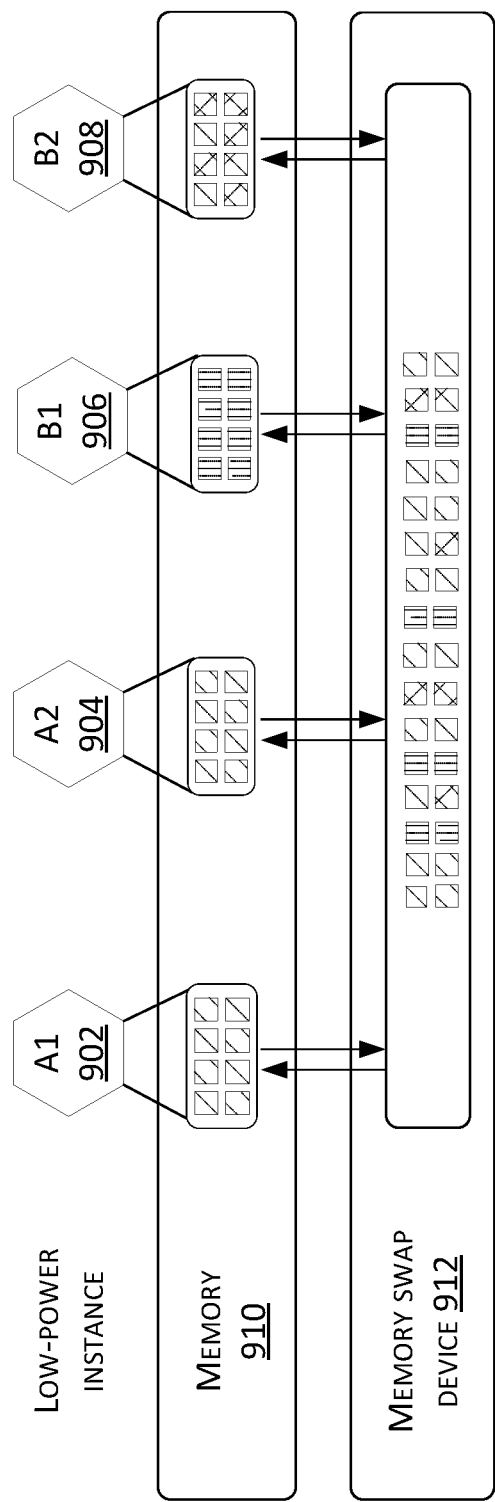
FIG. 9 is a schematic diagram of a memory swap function in kernel mode.

FIG. 9 is a schematic diagram of a memory swap function in kernel mode.

The low-power instances A1 902 and A2 904 of the application A and the low-power instances B1 906 and B2 908 of the application B respectively have corresponding memory data. For ease of understanding, different inner shadow filling means are used to represent the data of different instances in the figure.

As shown in FIG. 9, the memory data of all low-power instances at the memory 910 are swapped to and stored on the same memory swap device 912, that is, they share the same memory data swap device/storage device. For example, when swap-in and swap-out operations are performed frequently, the sequence in the swap device will be disrupted with too serious randomization, which will severely affect the read/write performance.

Therefore, the present disclosure also allows a configuration that uses a swap capability in user mode, that is, a memory swap function in user mode. Through the memory swap function in user mode, swap isolation at the container, process, and instance levels can be achieved. In addition, a formatted memory structure can be used to achieve pre-reading to a large extent and fast scrolling.

For the memory swap function in user mode, file mapping and sequential read/write methods can be used, and the read/write performance can adapt to the sequential read/write performance of different storage media. In this way, the dependence on the capability of randomly reading the swapping and storage device at high speed can also be reduced to a certain extent.

Figure 10:
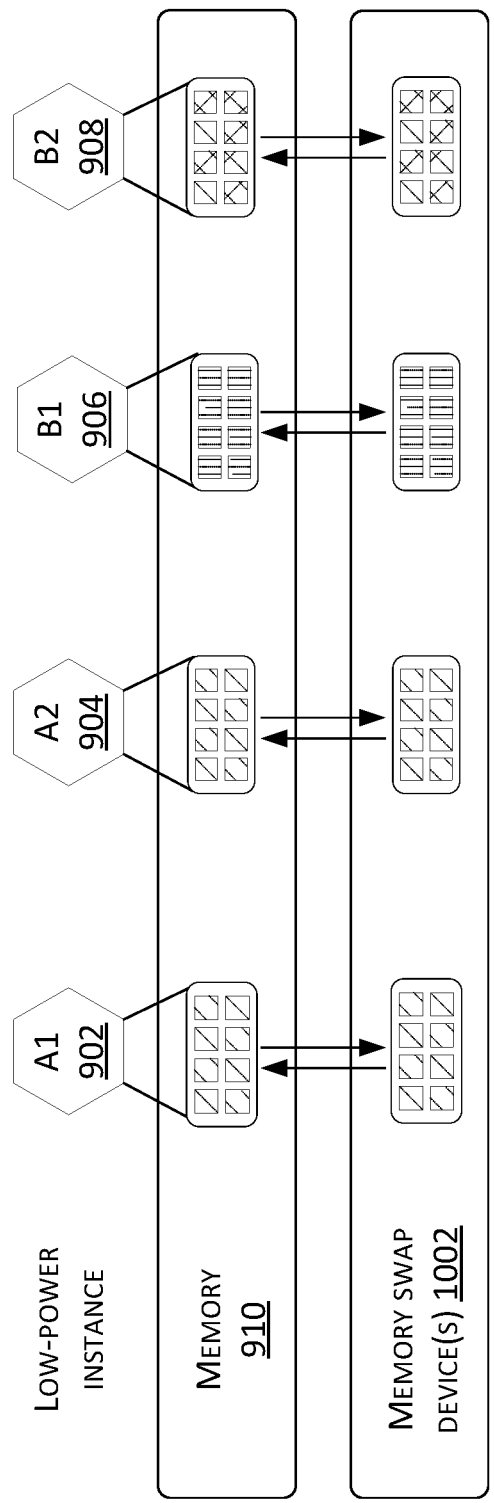
FIG. 10 is a schematic diagram of a memory swap function in user mode according to the present disclosure.

FIG. 10 is a schematic diagram of a memory swap function in user mode according to the present disclosure.

Through user-mode settings, the memory data corresponding to different instances or from different containers can be swapped to and stored on different storage devices, or on different pages of a storage device, so as to achieve the isolation of instance or container data.

In this way, the memory swap function in kernel mode may be used to cause the memory data of one or more low-power application instances to be transferred between the memory and the storage device. Alternatively, the memory swap function in user mode may be used to cause the memory data of one or more low-power application instances to be transferred between the memory and the storage device and to cause the memory data from different containers to be transferred to different storage devices 1002 or different pages of the storage device.

For applications or application instances, relevant staff may configure whether to use the memory swap function in kernel mode or the memory swap function in user mode.

A memory swap setting instruction for an application or an application instance may be received, for example, from relevant staff.

The memory swap setting instruction may be used to indicate whether to use the memory swap function in kernel mode or the memory swap function in user mode to perform memory data transfer for an application instance of the application or the application instance.

In this way, in response to the received memory swap setting instruction, the memory swap function used to perform the memory data transfer may be set for the application instance of the application or the application instance.

When the memory swap function in user mode is used, multiple enhanced SSDs (Solid State Drives) are used to construct storage devices with the same priority for swap.

After performing low-power conversion on the CPU and memory as described above, the target application instance has entered the low-power running state. Inactive memory data has been further swapped out to low-cost external IO devices (memory data swap device/storage device).

Then, it is possible to further downgrade the resources of the application instance, and return the resources saved from the instance's low-power running to the scheduling system, so as to schedule other high-priority tasks and achieve resource reuse.

Returning to FIG. 5, in Step S504, for example, the configuration downgrading apparatus 310 may be used to downgrade the resource configuration of the respective container where the at least one first application instance is located. At 504, resource configuration of respective container where at least one first application instance is located is downgraded. The resources released by the container may be returned to the cluster by updating the pod resource specification in place, and then the cluster may schedule the pod of other workloads to the node.

Here, for example, based on an in-place container resource update mechanism such as Kubernetes (K8s), the resource configuration of the container can be downgraded or upgraded. When the resource configuration of the container is downgraded, based on the in-place pod resource update mechanism, the resources released by the container where the application instance is located are returned to the scheduling system. Correspondingly, when the resource configuration of the container is upgraded during scale-up, resources are requested for the container from the scheduling system based on the in-place pod resource update mechanism.

Here, resource management includes two levels: the internal runtime level of the container and the K8s level. For example, the system originally allocates 4C8G (4 cores, 8G memory) to an application instance. So many resources are used at runtime, but after entering the low-power state, the application instance only occupies 1/10 of the resources. However, if the resources are updated even if they are not in the K8s layer, the scheduling layer will still think that the application instance occupies 4C8G resources. In this way, free resources cannot be allocated to other application instances or containers. Here, the K8s layer mainly includes metadata maintained in the scheduling layer.

The in-place container resource update can achieve the in-place update of pod resources and downgrade the resource configuration of the container where the current application instance is located without affecting the Kubernetes pod. In this way, low-power running of application instances and quota adjustment of container platform resources can be comprehensively achieved.

A pod is the smallest unit that can be created and deployed in Kubernetes, which is an application instance in a Kubernetes cluster and is always deployed on the same node. A Pod contains one or more containers, and also includes resources shared by containers such as storage and network. The pod can support multiple container environments, such as the currently popular container environment Docker.

So far, the scale-down according to the present disclosure has been described in detail, that is, the resource quota of at least one first application instance of a low-traffic application is limited to cause the instance to enter the low-power (running) state; and the resource configuration of the container where these first application instances are located is further downgraded to allocate the resources released from the container to other containers in the pod where the container is located.

The following describes the scale-up operations.

Next, the scale-up according to the present disclosure will be described. As described above, the scale-up here may be performed, for example, in response to a scale-up instruction for a low-traffic application, or for example, in response to that a low-traffic application's traffic rises above a second predetermined threshold.

After an application is scaled down, at least one application instance thereof is in the low-power running mode. The low-power running mode can support dynamic resource configuration updates.

For example, when there is a traffic request, or when the traffic increases and scale-up is needed, a second application instance that is currently running in the low-power mode can be quickly pulled up to be able to accommodate all traffic.

Figure 6:
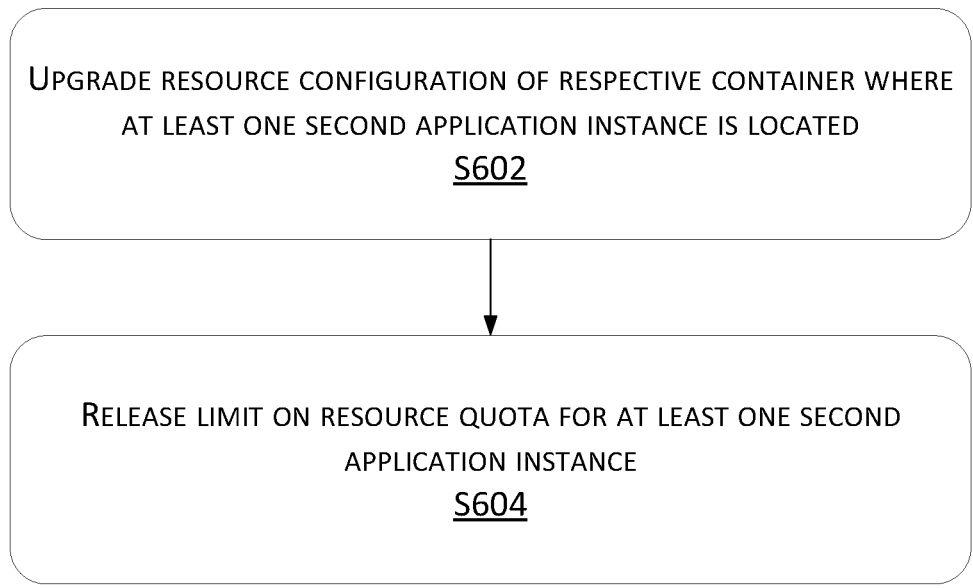
FIG. 6 is a schematic flowchart of a scale-up stage of an application management method according to an embodiment of the present disclosure.

FIG. 6 is a schematic flowchart of Step S406 of a scale-up stage of an application management method according to an embodiment of the present disclosure.

As shown in FIG. 6, in Step S602, for example, the configuration upgrading apparatus 314 may be used to upgrade the resource configuration of the respective container where at least one second low-power application instance of the application to be scaled up is located.

Similarly, as described above, for example, the resource configuration of containers in a pod can be upgraded based on the in-place container resource update mechanism.

Here, it may cause, in priority, a second application instance in a container on a machine with relatively idle resources in a node where the container is located to enter the online state.

That is, the scale-up will give priority to the second application instance on the machine with relatively idle resources in the node where the container is located, and request the scheduling system to upgrade the resource configuration to the original specification or the specification determined based on the current traffic.

In other words, when the application to be scaled up has multiple low-power application instances and different application instances are on different machines, the application instance on the machine with relatively idle resources is restored to the online state first, and its resource quota is restored accordingly to upgrade the resource configuration of the container where it is located.

After the resource configuration of the container is upgraded, the native C group limit can be released so that the application instance can exit the low-power running mode (low-power state) at runtime and enter the online mode (online state).

That is, in Step S604, for example, the quota restoring apparatus 312 may be used to release the limit on the resource quota of at least one second application instance.

Similarly, as described above, the limit on the resource quota of the application instance may also be released based on the Cgroups mechanism.

In addition, based on the live migration function of the checkpoint/restore in userspace (CRIU) technology, low-power application instances can be migrated to relatively idle machines, thus further solving the problem of resource squeeze.

In this way, when the low-power running mode needs to be scaled up, with respect to the problem that the machine where the instance to be scaled up is located has insufficient resources, the live migration (also known as "hot migration" or "online migration") function of the checkpoint/restore in userspace (CRIU) technology can be introduced to migrate the low-power running instance to an idle target machine for scheduling. That is, the low-power application instance can be horizontally migrated.

On the one hand, when the application instance is about to enter the online state but resources in the node where it is located are insufficient, the application instance is migrated to a relatively idle node based on the live migration function of the checkpoint/restore in userspace (CRIU) technology.

On the other hand, when multiple low-power application instances exist on the same node, it can be predicted, for example, that when these low-power application instances are to be restored to online application instances in the future, the resources on the node will be insufficient, that is, the problem of resource squeeze may occur. In this way, one or more of the application instances can be made into a checkpoint snapshot based on the checkpoint/restore in userspace (CRIU) technology, and then based on the checkpoint snapshot, the one or more of the application instances can be restored on the relatively idle node. Here, for example, the memory space occupied by at least one second application instance may be caused to be outside the memory range for the low-power instances in the memory, that is, within the above-mentioned execution range of the periodic memory management operation in the memory.

When the memory data of the second application instance has been transferred to the swap device/storage device/external IO device, for example, the memory data stored on the external IO device can be quickly swapped in through the memory swap storage apparatus 306, that is, the memory data of the second application instance is transferred from the storage device to the execution range in the memory.

In addition, the default swap-in (swap from the storage device to the memory) of the memory swap function in kernel mode is a lazy mode, which is not suitable for quick pop-up scenarios.

In order to meet the requirements of serverless computing (Serverless) for extremely fast swap-in, a layer of concurrent swap-in logic can be implemented in the memory swap function in user mode.

The memory swap function in user mode may be used to simultaneously transfer the memory data of multiple low-power application instances from the memory to different storage devices or different pages of the storage device. On the other hand, the memory swap function in user mode may also be used to simultaneously transfer the memory data of multiple low-power application instances from different storage devices or different pages of the storage device to the memory.

In this way, the speed of one-time memory swap-in can reach the upper limit of TO, greatly improving the scale-up performance.

Moreover, in order to enhance the performance and increase the upper limit of IO throughput during swap-in, in the structure of the underlying swap device/storage device, based on the priority feature of the swap subsystem, multiple enhanced SSDs (ESSDs) may be used to construct swap devices/storage devices with the same priority to achieve the redundant array of independent disks (RAID) capability of swap. In actual use, the IO throughput of memory data swap-in can be greatly improved, achieving extremely fast second-level elasticity.

For example, in an application example, if a single 1.2T ESSD is replaced with three 400G ESSDs, the TO throughput may be improved from 350M/s to 960M/s.

Serverless computing emphasizes the rapid creation of application instances. The solution of the present disclosure may utilize the coroutine feature of the Go language to simultaneously access multiple segments of memory data in combination with the Linux pagemap mapping structure. Therefore, a method for quick memory swap-in in a serverless scenario is provided. Compared with the legacy operating system based on lazy access loading, it can make full use of the maximum bandwidth of IO to load the memory data swapped out to external storage media into the memory, and provide services quickly.

Here, the scale-up process according to the present disclosure is described in detail, that is, upgrade the resource configuration of the respective container where the second application instance is located; and release the limit on the resource quota for the second application instance to cause the second application instance to exit the low-power running mode/low-power state.

So far, the scaling in the container-based application management solution according to the present disclosure has been described in detail.

Therefore, the present disclosure proposes an application management solution, which can be used to achieve rapid elasticity of stock applications without having to make any change to the application architecture.

The present disclosure proposes a low-power running mode of an application instance in a serverless cloud computing scenario.

Combined with the low-power running mode of the application instance, the swap capabilities both in kernel mode and in user mode, as well as the in-place container update capability in the K8s layer (the process of returning resources from the container) for example, a set of solution for controlling low-power running of application instances in user mode is provided.

The surviving objects cached in the low-power state may be caused to occupy very few system resources. When the traffic request reaches the threshold that needs to be scaled up, the online service application instance can be horizontally scaled up within seconds, and resources can be requested at start.

In addition, in the embodiment, a set of high-performance memory swap-out/swap-in solution is provided by performing concurrency control in user mode and using the swap priority feature, which can achieve second-level elastic scale-up in a serverless scenario.

Moreover, it is also possible to record, display, or count some relevant information about the elastic scale-down and scale-up of the application, so as to make evaluation, adjustment, and intervention when necessary. For example, the relevant information may include the respective number of low-power application instances and online application instances, the ratio of the numbers of the application instances in the two states, the corresponding state duration, and the time it takes for an application instance to enter the online state from the low-power state, the time spent on application scale-up, the time spent on application scale-down, etc.

The application scale-up and scale-down solutions according to the application management method of the present disclosure can be applied to various application scenarios, especially application scenarios where the traffic changes greatly with time, in other words, the scenarios where it is necessary to deal with huge traffic simultaneously in a certain period of time but the traffic that needs to be dealt with at other times is relatively small, thus requiring elastic scaling, for example, large-scale promotional activities during a specific period of time, and scenarios such as train ticket sales. In such application scenarios, traffic that is several times or even tens or hundreds of times higher than usual will suddenly burst out in a very short period of time. However, the application management solution of the present disclosure can excellently meet the needs of application scaling in these scenarios.

Figure 11:
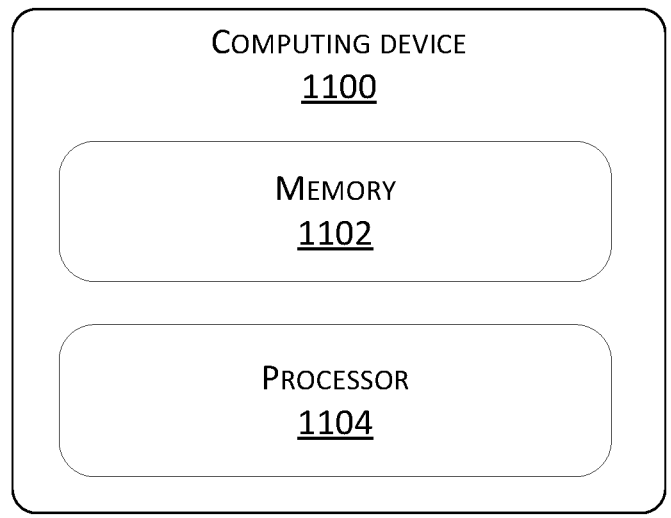
FIG. 11 is a schematic structural diagram of a computing device that can be used to implement the above-described application management method according to an embodiment of the present disclosure.

FIG. 11 is a schematic structural diagram of a computing device that can be used to implement the above-described application management method according to an embodiment of the present disclosure.

Referring to FIG. 11, a computing device 1100 includes a memory 1102 and a processor 1104.

The processor 1104 may be a multi-core processor, or may include multiple processors. In some embodiments, the processor 1104 may include a general-purpose main processor and one or more special co-processors, such as a graphics processing unit (GPU), a digital signal processor (DSP), and so on. In some embodiments, the processor 1104 may be implemented using a customized circuit, such as an application specific integrated circuit (ASIC) or a field programmable logic gate array (FPGA).

The memory 1102 may include various types of storage units, such as system memories, read-only memories (ROMs), and permanent storage devices. Here, the ROM may store static data or instructions required by the processor 1104 or other modules of a computer. The permanent storage device may be a read-write storage device. The permanent storage device may be a non-volatile storage device that does not lose stored instructions and data even if the computer is powered off. In some implementation manners, the permanent storage device uses a large-capacity storage device (for example, magnetic or optical disk, flash memory, etc.). In some other implementation manners, the permanent storage device may be a removable storage device (for example, a floppy disk, an optical drive, etc.). The system memory may be a read-write storage device or a volatile read-write storage device, such as a dynamic random access memory. The system memory may store some or all instructions and data that the processor needs at runtime. In addition, the memory 1102 may include any combination of computer-readable storage media, including various types of semiconductor memory chips (DRAMs, SRAMs, SDRAMs, flash memories, and programmable read-only memories), and magnetic disks and/or optical disks may also be used. In some implementation manners, the memory 1102 may include a removable readable and/or writable storage device, such as a compact disc (CD), a read-only digital versatile disc (for example, DVD-ROMs, dual-layer DVD-ROMs, etc.), a Blu-ray read-only disc, a super density disc, a flash memory card (for example, SD cards, mini SD cards, Micro-SD cards, etc.), and a magnetic floppy disk. The computer-readable storage media do not contain carrier waves and transient electronic signals transmitted wirelessly or by wire.

A computer-executable instruction is stored in the memory 1102, and when the computer-executable instruction is processed by the processor 1104, the processor 1104 may be caused to execute the application management method mentioned above.

The application management solution according to the present invention has been described in detail above with reference to the accompanying drawings.

In addition, the method according to the present invention may also be implemented as a computer program or computer program product, and the computer program or computer program product includes computer program instructions for executing the above-described steps defined in the above-described method of the present invention.

Alternatively, the present invention may also be implemented as a non-transitory machine-readable storage medium (or computer-readable storage medium, or machine-readable storage medium) with an computer-executable instruction (or computer program, or computer instruction) stored thereon, and when the computer-executable instruction (or computer program, or computer instruction) is executed by the processor of an electronic device (or computing device, server, etc.), the processor is caused to execute the steps of the above-described method according to the present invention.

It should also be understood by those skilled in the art that the various exemplary logical blocks, modules, circuits, and algorithm steps described in connection with the disclosure herein may be implemented as electronic hardware, computer software, or combinations thereof.

The flowcharts and block diagrams in the accompanying drawings illustrate the architectures, functions, and operations of possible implementations of systems and methods according to multiple embodiments of the present invention. In this regard, each block in the flowcharts or block diagrams may represent a module, program segment, or instruction portion that includes one or more computer-executable instructions for implementing the specified logical functions. It should also be noted that, in some alternative implementations, the functions noted in the blocks may occur in an order different from that noted in the accompanying drawings. For example, two blocks shown in succession may, in fact, be executed substantially concurrently, or the blocks may sometimes be executed in the reverse order, depending on the functionality involved. It should also be noted that each block in the block diagrams and/or flowcharts and combinations of the blocks in the block diagrams and/or flowcharts can be implemented by dedicated hardware-based systems for performing the specified functions or operations, or can be implemented by a combination of dedicated hardware and computer instructions.

The various embodiments of the present invention have been described above, which are only exemplary rather than exhaustive, and are not limited to the disclosed embodiments. Many modifications and changes will be apparent to a person of ordinary skill in the art without departing from the scope and spirit of the described embodiments. The terms used herein are chosen to best explain the principle and practical applications of each embodiment, or improvement of technology in the market, or to enable a person of ordinary skill in the art to understand each embodiment disclosed herein.

The present disclosure may further be understood with clauses as follows.

Clause 1. A container-based application management method, comprising:
configuring a container-based serverless computing system such that an application instance is allowed to be in one of an online state and a low-power state at runtime, wherein the application instance consumes less power and/or resources in the low-power state than it does in the online state;
in response to scaling down an application, causing at least one first application instance of the application in the online state to enter the low-power state; and
in response to scaling up the application, causing at least one second application instance of the application in the low-power state to enter the online state.

Clause 2. The method according to clause 1, wherein
the causing the at least one first application instance of the application in the online state to enter the low-power state comprises:
imposing a limit on a resource quota for the at least one first application instance; and
downgrading a resource configuration of a respective container where the at least one first application instance is located,
and/or the causing the at least one second application instance of the application in the low-power state to enter the online state comprises:
upgrading a resource configuration of a respective container where the at least one second application instance is located; and
releasing a limit on a resource quota for the at least one second application instance.

Clause 3. The method according to clause 2, wherein the causing the at least one second application instance of the application in the low-power state to enter the online state comprises:
causing, in priority, a second application instance in a container on a machine with relatively idle resources in a node where the container is located to enter the online state.

Clause 4. The method according to clause 2, further comprising:
when the application instance is about to enter the online state but resources in a node where it is located are insufficient, migrating the application instance to a relatively idle node based on a live migration function of a technology named checkpoint/restore in userspace (CRIU); and/or
when multiple application instances in the low-power state are located on the same node, making one or more of the application instances into a checkpoint snapshot based on the CRIU technology, and then based on the checkpoint snapshot, restoring the one or more of the application instances on the relatively idle node.

Clause 5. The method according to clause 2, wherein
the limit on the resource quota for the application instance is imposed or released based on a Cgroups mechanism; and/or
when the resource configuration of the container is downgraded, based on an in-place pod resource update mechanism, resources released by the container where the application instance is located are returned to a scheduling system; and/or
when the resource configuration of the container is upgraded, based on the in-place pod resource update mechanism, resources are requested for the container from the scheduling system.

Clause 6. The method according to clause 1, wherein
the causing the at least one first application instance to enter the low-power state comprises: based on a CPU sharing function, adding a plurality of the first application instances to run in a CPU group with a low-power specification, wherein application instances in the CPU group with the low-power specification share the CPU; and/or the causing the at least one second application instance to enter the online state comprises: causing the second application instance to exit the CPU group with the low-power specification.

Clause 7. The method according to clause 1, wherein the causing the at least one first application instance to enter the low-power state comprises: causing a memory space occupied by the at least one first application instance to be within a memory range for low-power instances in a memory; and/or the causing the at least one second application instance to enter the online state comprises: causing a memory space occupied by the at least one second application instance to be outside the memory range for the low-power instances in the memory.

Clause 8. The method according to clause 7, wherein the memory range for the low-power instances is a range outside an execution range of a periodic memory management operation in the memory.

Clause 9. The method according to clause 8, wherein the periodic memory management operation comprises a memory garbage collection operation and/or a memory release operation for releasing a memory that has not been used within a predetermined period.

Clause 10. The method according to clause 8, further comprising:

in response to a range adjustment instruction, adjusting the execution range and/or a size thereof; and/or when a first application instance occupying a memory space enters the low-power state, setting the execution range to exclude the memory space occupied by the first application instance; and/or when a first application instance occupying a memory space enters the online state, setting the execution range to include the memory space occupied by the first application instance.

Clause 11. The method according to clause 1, wherein the causing the at least one first application instance to enter the low-power state comprises:

closing some resources used by the first application instance or reducing a usage amount of some resources, and only reserving some system resources used by the first application instance.

Clause 12. The method according to clause 1, further comprising:

causing memory data of one or more application instances in the low-power state to be transferred between a memory and a storage device.

Clause 13. The method according to clause 12, wherein the causing the memory data of the one or more application instances in the low-power state to be transferred between the memory and the storage device comprises:

using a memory swap function in kernel mode to cause the memory data of the one or more application instances in the low-power state to be transferred between the memory and the storage device; and/or using a memory swap function in user mode to cause the memory data of the one or more application instances in the low-power state to be transferred between the memory and the storage device and to cause memory data from different containers to be transferred to different storage devices or different pages of the storage device.

Clause 14. The method according to clause 13, wherein memory data of multiple application instances in the low-power state are simultaneously transferred from the memory to the different storage devices or the different pages of the storage device by using the memory swap function in user mode, and/or memory data of multiple application instances in the low-power state are simultaneously transferred from the different storage devices or the different pages of the storage device to the memory.

Clause 15. The method according to clause 13, further comprising:

receiving a memory swap setting instruction for an application or an application instance, wherein the memory swap setting instruction is configured to indicate whether the memory swap function in kernel mode or the memory swap function in user mode is used to perform memory data transfer for an application instance of the application or the application instance; and in response to the memory swap setting instruction, setting the memory swap function used to perform the memory data transfer for the application instance of the application or the application instance.

Clause 16. The method according to clause 13, wherein when the memory swap function in user mode is used, multiple enhanced SSDs are used to construct storage devices with the same priority for swap.

Clause 17. The method according to clause 12, wherein the causing the memory data of the one or more application instances in the low-power state to be transferred between the memory and the storage device comprises:

based on a least recently used algorithm, selecting the memory data of the one or more application instances in the low-power state, and transferring and persisting it from the memory into the storage device; and/or in response to a swap-back instruction or a traffic request or an instance deployment strategy change, transferring the memory data of the one or more application instances in the low-power state on the storage device back to the memory.

Clause 18. The method according to clause 12, wherein after memory data of the second application instance has been transferred to the storage device, the causing the at least one second application instance of the application in the low-power state to enter the online state further comprises:

transferring the memory data of the second application instance from the storage device to an execution range of a periodic memory management operation in the memory.

Clause 19. The method according to clause 1, wherein in response to a scale-down instruction for the application, or in response to that the application becomes a low-traffic application due to its traffic falling below a first predetermined threshold, the application is scaled down; and/or in response to a scale-up instruction for the application, or in response to that the application's traffic rises above a second predetermined threshold, the application is scaled up.

Clause 20. A container-based application management apparatus deployed in a container-based serverless computing system, wherein the serverless computing system is configured to allow an application instance to be in one of an online state and a low-power state at runtime, the application instance consumes less power and/or resources in the low-power state than it does in the online state, and the apparatus comprises:
- a scale-down apparatus, configured to, in response to scaling down an application, cause at least one first application instance of the application in the online state to enter the low-power state; and
- a scale-up apparatus, configured to, in response to scaling up the application, causing at least one second application instance of the application in the low-power state to enter the online state.

Clause 21. The apparatus according to clause 20, wherein the scale-down apparatus comprises:
- a quota limiting apparatus, configured to impose a limit on a resource quota for the at least one first application instance of a low-traffic application; and
- a configuration downgrading apparatus, configured to downgrade a resource configuration of a respective container where the at least one first application instance is located.

Clause 22. The apparatus according to clause 20, wherein the scale-up apparatus comprises:
- a configuration upgrading apparatus, configured to upgrade a resource configuration of a respective container where the at least one second application instance is located; and
- a quota restoring apparatus, configured to release a limit on a resource quota for the at least one second application instance.

Clause 23. The apparatus according to any one of clauses 20 to 22, further comprising:
- a memory swap storage apparatus, configured to cause memory data of one or more first application instances in the at least one first application instance to be transferred between a memory and a storage device.

Clause 24. A computing device, comprising:
- a processor; and
- a memory having a computer-executable instruction stored thereon, wherein when the computer-executable instruction is executed by the processor, the processor is caused to execute the method according to any one of clauses 1 to 19.

Clause 25. A non-transitory machine-readable storage medium having a computer-executable instruction stored thereon, wherein when the computer-executable instruction is executed by a processor of an electronic device, the processor is caused to execute the method according to any one of clauses 1 to 19.

What is claimed is:

1. A method comprising:
    configuring a container-based serverless computing system such that an application instance is allowed to be in one of an online state and a low-power state at runtime, wherein the application instance consumes less power or resources in the low-power state than it does in the online state;
    in response to scaling down an application, causing at least one first application instance of the application in the online state to enter the low-power state, the causing the at least one first application instance to enter the low-power state comprises causing a memory space occupied by the at least one first application instance to be within a memory range for low-power instances in a memory; and
    in response to scaling up the application, causing at least one second application instance of the application in the low-power state to enter the online state, the causing the at least one second application instance to enter the online state comprises causing the memory space occupied by the at least one second application instance to be outside the memory range for the low-power instances in the memory.

2. The method according to claim 1, wherein the causing the at least one first application instance of the application in the online state to enter the low-power state comprises:
    imposing a limit on a resource quota for the at least one first application instance; and
    downgrading a resource configuration of a respective container where the at least one first application instance is located.

3. The method according to claim 2, further comprising:
    in response to determining that the resource configuration of the respective container is downgraded, based on an in-place pod resource update mechanism, returning resources released by the respective container to a scheduling system.

4. The method according to claim 3, wherein a memory range for a low-power instance is a range outside an execution range of a periodic memory management operation in a memory.

5. The method according to claim 4, wherein the periodic memory management operation comprises a memory garbage collection operation or a memory release operation for releasing the memory that has not been used within a predetermined period.

6. The method according to claim 4, further comprising:
    in response to a range adjustment instruction, adjusting the execution range or a size of the execution range; and
    in response to determining that a first application instance occupying a memory space enters the low-power state, setting the execution range to exclude the memory space occupied by the first application instance.

7. The method according to claim 1, wherein the causing the at least one first application instance to enter the low-power state comprises: based on a CPU sharing function, adding a plurality of first application instances from the at least one first application instance to run in a CPU group with a low-power specification, wherein application instances in the CPU group with the low-power specification share one or more CPUs.

8. The method according to claim 1, wherein the causing the at least one second application instance of the application in the low-power state to enter the online state comprises:
    upgrading a resource configuration of a respective container where the at least one second application instance is located; and
    releasing a limit on a resource quota for the at least one second application instance.

9. The method according to claim 8, wherein the causing the at least one second application instance of the application in the low-power state to enter the online state further comprises:
    causing, in priority, a second application instance in a container on a machine with idle resources in a node where the container is located to enter the online state.

10. The method according to claim 8, further comprising:
    in response to determining that the application instance is to enter the online state and resources in a node where it is located are insufficient, migrating the application instance to a relatively idle node compared with a current node based on a live migration function of a checkpoint/restore in userspace (CRIU); or in response to determining that multiple application instances in the low-power state are located on a same node, making one or more of the multiple application instances into a checkpoint snapshot based on the CRIU and, based on the checkpoint snapshot, restoring the one or more of the multiple application instances on the relatively idle node.

11. The method according to claim 8, wherein:
the limit on the resource quota for the application instance is imposed or released based on a control groups (Cgroups) mechanism; and
in response to determining that the resource configuration of the respective container is upgraded, based on an in-place pod resource update mechanism, requesting resources for the respective container from a scheduling system.

12. The method according to claim 1, wherein the causing the at least one second application instance to enter the online state comprises:
causing the at least one second application instance to exit a CPU group with a low-power specification.

13. The method according to claim 1, further comprising:
causing memory data of one or more application instances in the low-power state to be transferred between a memory and a storage device.

14. The method according to claim 13, wherein the causing the memory data of the one or more application instances in the low-power state to be transferred between the memory and the storage device comprises:
using a memory swap function in a kernel mode to cause the memory data of the one or more application instances in the low-power state to be transferred between the memory and the storage device; or
using a memory swap function in a user mode to cause the memory data of the one or more application instances in the low-power state to be transferred between the memory and the storage device and to cause memory data from different containers to be transferred to different storage devices or different pages of the storage device.

15. The method according to claim 14, wherein:
the memory data of multiple application instances in the low-power state are simultaneously transferred from the memory to the different storage devices or the different pages of the storage device by using the memory swap function in the user mode; or
the memory data of multiple application instances in the low-power state are simultaneously transferred from the different storage devices or the different pages of the storage device to the memory.

16. The method according to claim 14, further comprising:
receiving a memory swap setting instruction for an application or an application instance, wherein the memory swap setting instruction is configured to indicate whether the memory swap function in the kernel mode or the memory swap function in the user mode is used to perform memory data transfer for an application instance of the application or the application instance; and
in response to the memory swap setting instruction, setting the memory swap function used to perform the memory data transfer for the application instance of the application or the application instance.

17. The method according to claim 14, further comprising:
in response to determining that the memory swap function in user mode is used, using multiple enhanced SSDs to construct storage devices with a same priority for swap.

18. The method according to claim 13, wherein the causing the memory data of the one or more application instances in the low-power state to be transferred between the memory and the storage device comprises:
based on a least recently used algorithm, selecting the memory data of the one or more application instances in the low-power state, and transferring and persisting it from the memory into the storage device; and/or
in response to a swap-back instruction or a traffic request or an instance deployment strategy change, transferring the memory data of the one or more application instances in the low-power state on the storage device back to the memory.

19. The method according to claim 13, wherein after memory data of a second application instance has been transferred to the storage device, the causing the at least one second application instance of the application in the low-power state to enter the online state further comprises:
transferring the memory data of the second application instance from the storage device to an execution range of a periodic memory management operation in the memory.

20. A computing device comprising:
one or more processors; and
one or more memories storing thereon computer-readable instructions that, when executed by the one or more processors, cause the one or more processors to perform acts comprising:
configuring a container-based serverless computing system such that an application instance is allowed to be in one of an online state and a low-power state at runtime, the application instance consuming less power or resources in the low-power state than it does in the online state;
in response to scaling down an application, causing at least one first application instance of the application in the online state to enter the low-power state, the causing the at least one first application instance to enter the low-power state comprising based on a CPU sharing function, adding a plurality of first application instances from the at least one first application instance to run in a CPU group with a low-power specification, application instances in the CPU group with the low-power specification sharing one or more CPUs; and
in response to scaling up the application, causing at least one second application instance of the application in the low-power state to enter the online state.

21. One or more memories storing thereon non-transitory computer-readable instructions that, when executed by one or more processors, cause the one or more processors to perform acts comprising:
configuring a container-based serverless computing system such that an application instance is allowed to be in one of an online state and a low-power state at runtime, the application instance consuming less power or resources in the low-power state than it does in the online state;
in response to scaling down an application, causing at least one first application instance of the application in the online state to enter the low-power state, the causing the at least one first application instance of the application in the online state to enter the low-power state comprising:

imposing a limit on a resource quota for the at least one first application instance;

downgrading a resource configuration of a respective container where the at least one first application instance is located; and in response to determining that the resource configuration of the respective container is downgraded, based on an in-place pod resource update mechanism, returning resources released by the respective container to a scheduling system; and in response to scaling up the application, causing at least one second application instance of the application in the low-power state to enter the online state, wherein a memory range for a low-power instance is a range outside an execution range of a periodic memory management operation in a memory.

* * * * *